United States Patent
Barber et al.

(10) Patent No.: US 6,799,030 B2
(45) Date of Patent: Sep. 28, 2004

(54) METHOD AND APPARATUS FOR LOW POWER OPERATION OF AN RF WIRELESS MODEM

(75) Inventors: Douglas Barber, Calgary (CA); Kevin Meyer, Calgary (CA)

(73) Assignee: Novatel Wireless, Inc., San Diego, CA (US)

( * ) Notice: Subject to any disclaimer, the term of this patent is extended or adjusted under 35 U.S.C. 154(b) by 478 days.

(21) Appl. No.: 09/976,703

(22) Filed: Oct. 11, 2001

(65) Prior Publication Data

US 2002/0106997 A1 Aug. 8, 2002

Related U.S. Application Data

(60) Provisional application No. 60/239,776, filed on Oct. 11, 2000.

(51) Int. Cl.[7] .................................................. H04B 1/16
(52) U.S. Cl. ............................... 455/343.1; 455/574.1; 455/127.1; 375/222; 375/361
(58) Field of Search ............................ 455/343.1, 574, 455/127, 557, 126, 130, 210, 312, 293, 343.2, 343.5, 344, 166, 518; 375/222, 315, 340, 361

(56) References Cited

U.S. PATENT DOCUMENTS

| | | | |
|---|---|---|---|
| 5,574,773 A | * 11/1996 | Grob et al. | 455/466 |
| 5,806,006 A | 9/1998 | Dinkins | |
| 5,917,854 A | * 6/1999 | Taylor et al. | 375/222 |
| 5,953,658 A | * 9/1999 | Scott | 455/422.1 |
| 6,049,745 A | * 4/2000 | Douglas et al. | 701/23 |
| 6,058,289 A | 5/2000 | Gardner et al. | |
| 6,073,035 A | 6/2000 | Witter | |
| 6,078,826 A | 6/2000 | Croft et al. | |
| 6,112,269 A | 8/2000 | Nordling | |
| 6,487,264 B1 | * 11/2002 | Alley et al. | 375/361 |
| 6,671,517 B1 | * 12/2003 | Lin et al. | 455/518 |
| 6,697,421 B1 | * 2/2004 | Monroe et al. | 375/222 |
| 2003/0153368 A1 | * 8/2003 | Bussan et al. | 455/574 |

* cited by examiner

Primary Examiner—Cong Van Tran
(74) Attorney, Agent, or Firm—Coudert Brothers LLP

(57) ABSTRACT

The present invention provides for a method and apparatus for extending battery life in a radio frequency ("RF") wireless modem by automatically commanding the RF modem into a low power, auto-sleep-no-coverage mode when coverage is not available. The auto-sleep-no-coverage mode timing is configurable through software parameters in the operating system of the modem. The invention conforms to the Cellular Digital Packet Data (CDPD) Specification and increases the standby time of the device outside the coverage area to that similar to the standby time when the modem is within a coverage area. One embodiment of the present invention uses two software programmable timers and a preferred embodiment of the invention uses three software programmable timers and a counter.

19 Claims, 6 Drawing Sheets

METHOD AND APPARATUS FOR LOW POWER OPERATION OF AN RF WIRELESS MODEM

This application claims the benefit of U.S. Provisional Application No. 60/239,776 filed on Oct. 11, 2000.

FIELD OF THE INVENTION

The present invention is directed to wireless radio frequency modems and, more specifically, to a method and apparatus for extending battery life in an RF wireless modem by automatically commanding the RF modem into a low power, auto-sleep-no-coverage mode when coverage is not available.

BACKGROUND OF THE INVENTION

Current wireless radio frequency ("RF") modems that cooperatively operate with a host computing device ("host computer") typically include: (1) a radio portion, also called an RF front end or an RF head; (2) a modulator/demodulator portion, also called a baseband processing unit or baseband chip; (3) a central processing unit ("CPU") or processor; (4) a memory; and (5) an interface. These modems typically operate using software code to communicate between a user and a base station. The above modem components collectively operate during a wireless communications process to receive an electromagnetic RF signal in a receive mode, wherein the RF signal contains information to be extracted from the received RF signal, and in a transmit mode, wherein the components work collectively to transmit an electromagnetic RF signal, and the RF signal contains the information to be transmitted. Moreover, during the receive and transmit modes, the modem components collectively operate to perform three principal modem functions: RF conversion, baseband processing and protocol stack control.

Typically during RF conversion, the RF head receives the RF signal during the receive mode and converts that RF signal into a modulated baseband analog signal and, during the transmit mode, the RF head converts a modulated baseband analog signal into an RF signal for transmission. During baseband processing, the baseband processing unit in the receive mode demodulates the modulated baseband analog signal by extracting a plurality of data bits that correspond to the information being received. In the transmit mode, the baseband processing unit generates the modulated baseband analog signal for processing by the RF head.

As part of the above wireless communications process, data bits being transmitted are wrapped with protocol bits of data to facilitate transmission, routing, and receiving of the data bits. Likewise, this protocol data must be removed to accurately reproduce, in the receiving RF modem, the data that was sent. The adding or stripping of the protocol bits, also called protocol stack control, is generally performed by the processor in the RF modem under the control of a protocol stack software program stored in the RF modem's memory. Finally, the interface feeds the data bits from the host computer to the RF modem for processing and transmission, and feeds to the host computer the reproduced data bits that were extracted from the received RF signal.

The host computer may typically be a battery powered laptop or palmtop computer, or a Personnel Digital Assistant (PDA), such as a Jornada 545 from Hewlett Packard Co., an IPAQ computer from Compaq Corporation, a Palm III or Palm V from Palm Corp. or a Visor from Handspring Corp. The host computer may also be other types of battery powered devices such as a point of sale terminal, a wireless meter reader, a wireless sensor transmitter or some other computing system. Typical interfaces between the wireless RF modem and the host computer are RS-232, USB, Parallel Port, IrDa, PCMCIA, Flash, Compact Flash, or a low voltage serial interface. However, other interfaces are also used, including a variety of other standard or proprietary interfaces.

Moreover, there are many wireless RF standards that must be considered in the design of any wireless RF modem. Some examples include: circuit switched commercial telecommunications standards including AMPS, CDMA (IS95A & B), and GSM; packet switched standards including CDPD, 1XRTT, GPRS, EDGE, W-CDMA and UMTS; and proprietary wide area wireless networks such as Metricom, Re-Flex, FLEX, Mobitex, and ARDIS.

Current technologies are primarily circuit-switched, meaning a continuous circuit transmission allows the network to route continuous data to a single location. Circuit-switched data requires a dedicated radio channel even when no data is being sent. Packet-switched data does not work the same way as circuit-switched data. With packet-switched data, the modem can send bursts and receive bursts of data. Each burst contains a sequence identification number allowing the regeneration of the blocks of data once all data is sent. A radio channel is occupied only for the duration of the data transmission instead of being dedicated to one user continuously.

A brief overview of some of the above standards is as follows. However, details of many of these standards are available through industry organizations. CDPD (Cellular Digital Packet Data) is a packet-data wireless technology developed by AT&T Wireless Services and other cellular carriers based on Internet Protocol (IP) networking. The CDPD wireless communication system exists to allow mobile users access to the Internet via a wireless link. The specification for this system is entitled "A Cellular Digital Packet Data System Specification" (the "CDPD Specification") Release 1.1 dated Jan. 19, 1995 and is available from Wireless Data Forum, Suite 800, 1250 Connecticut Ave. N.W., Washington, D.C. 20036. CDPD is deployed as an overlay to analog cellular networks. It enables analog networks such as AMPS (Advanced Mobile Phone Service) to carry packetized data alongside voice. It is primarily used to transmit brief messages, read e-mail, and perform some web browsing for, e.g., wireless enabled Personal Digital Assistants and RF wireless modem equipped laptops. CDPD uses either idle voice channels or dedicated data channels depending on network configuration. However, since the modem never makes an actual "phone call," the channel becomes immediately available for other data users after the transmission. At the switching center, packet services interconnect with the Internet or directly with corporate intranets using traditional networking methods such as frame relay. Service, available in most major cities in the US and Canada, is provided by major cellular companies.

GPRS is another kind of packet-switched data technology that is being developed for GSM networks. 1XRTT is a packet-switched data technology that uses CDMA techniques. Ricochet is a packet-switched data network operated by Metricom in the unlicensed ISM 902 MHz to 928 MHz band. EDGE, 3G, W-CDMA, and UMTS plus others are all planned to use packet data.

In the battery-operated host computing devices described above, e.g., a mobile unit, it is important to conserve power as much as possible. Therefore, in many of the above wireless air standards, and in CDPD in particular, there is an in-coverage sleep mode (or "state") detailed in the specifications. The RF wireless modem in the mobile unit coordinates a sleep-mode timer value with a base station controller and then issues a command to the control circuitry within the modem to direct the modem into a sleep mode with the parameters set by the negotiation. This in-coverage sleep mode is very efficient and effective. Unfortunately, if the mobile unit moves out of the coverage area while it is in a sleep mode then a lot of time and power is spent by the modem in searching and trying to re-establish communications with a base station controller. The battery power consumed while performing this search greatly reduces the mobile unit's standby time, particularly when compared to that enjoyed when the unit is within its service area where a low power mode can be used.

For CDPD for example, most of the operation of the RF wireless modem is defined in the CDPD Specification in two relevant sections. The first section, Section 6.8 in pub. 403 at pp. 58 through 62, describes a sleep mode procedure for in-coverage usage. The in-coverage sleep mode is a coordinated low power mode available and requested from the current CDPD base stations. This in-coverage mode is coordinated in that the registered modem device and the base station to which it is registered coordinates when the mobile device will enter into this low power mode so that data communication can still take place when the device wakes up again. The CDPD Specification defines this and a series of timing parameters that are used by the device to maintain this coordination.

The following description is taken directly from the CDPD Specification at page 58. The term "M-ES" means Mobile End Systems; "TEI" means Temporary Equipment Identifier; and "MDL" means Mobile Data Link in the following quoted text from the CDPD Specification:

"Sleep mode is an optional mode of operation that may be requested by an M-ES during the data link establishment procedure. Sleep mode is intended to assist power conservation strategies in the M-ES. General operation of sleep mode permits an M-ES to disable or power-down its receiver and associated circuitry. The procedure operates in the multiple frame established state as follows. If there are no frames being exchanged on the data link connection after a period of time defined by timer T203, the data link connection may be placed in the TEI-sleep state. The network shall not attempt to transmit information destined for the M-ES while in the sleep state. If after entering the sleep state, new frames become pending initial transmission, the network shall broadcast at periodic intervals a message containing a list of TEIs for which forward channel data is pending. M-ESs are expected to wake up at periodic intervals to determine if data for them is pending and notify the network when they are willing to receive. The M-ES may exit the sleep state at any time.

6.8.1 Negotiation for Use of Sleep Mode Use or non-use of sleep mode supervision is indicated by the IDLE TIMER Parameter Octet during the TEI Assignment procedure initiated by the M-ES. Non-use of sleep mode supervision is selected by negotiating a value for timer T203 of 0.

6.8.2 Idle Timer T203. Timer T203 represents the maximum time allowed without frames being exchanged on the data link connection. On the user side, timer T203 is started or restarted upon transmission of a Data Link Layer frame (of any type) on the reverse channel. On the network side, timer T203 is started or restarted upon receipt of a Data Link Layer frame (of any type) on the reverse channel.

6.8.3 Expiry of Timer T203. If timer T203 expires, the data link entity shall: * Enter the TEI-sleep state *Issue a MDL-SLEEP indication primitive on the user side. The layer management entity may take power conserving measures (e.g., disabling the radio receiver or other non-essential portions of its circuitry). The details of operation while in this state are implementation dependent."

The second relevant section in the CDPD Specification is Section 3.3.9 in pub. 405 at pp. 28 through 31. This section describes the theory of operation that is assumed when the device is outside coverage. This theory of operation describes a channel scanning algorithm that attempts to find service again. Although not specifically mandated, it is assumed that the unit would stay in this channel scanning mode until coverage is found again or the unit is turned off by the mobile user. Unfortunately, since the modem is constantly channel scanning while out of coverage, it is constantly tuning and retuning the synthesizers to attempt to "lock-on" to CDPD service. This means that the modem is consuming a relatively large amount of current from the battery while it searches for service on these channels and will continue to consume this current until service is detected again, the unit is shut off, or the unit exhausts its battery.

The following description is taken directly from the CDPD Specification at page 28. The term "RRME" means Radio Resource Management Entity and "SPNI" means Service Provider Network Identifier:

"The RRME shall execute this procedure on the search for a CDPD channel stream when the Adjacent Cell Scan procedure is unsuccessful or has insufficient information. These conditions include:

Power up (initial acquisition)

Unacceptable SPNI, SPI or WASI on the current cell or adjacent cells

Unsuccessful after exhausting the RF channel list of adjacent cells or after an implementation dependent time. The order in which RF channels are searched shall be implementation dependent.

Examples of possible search algorithms include but may not be limited to:

Sequential search of all possible channels, or based on the A/B side preference indicated by the WASI values of acceptable WASIs.

A search order making use of knowledge of the allocation of channels within a cell (e.g., in steps of 21 channels)

A search criteria making use of knowledge gained by examining RSSI or data found on AMPS control channels A search order giving priority to allocated channels in cells previously acquired by the M-ES A search order based on allocated channels in cells frequently used by the M-ES.

The RRME shall perform the following procedure:

a. Issue a PH-OPEN.request primitive b. Determine the RSSI via a PH-RSSI.indication primitive c. If the RSSI is determined to be unacceptable, via implementation dependent criteria, the RRME shall select another channel d. Issue a MAC-OPEN.request primitive 1. If the response is a MAC-CLOSE.indication primitive, indicating the MAC layer was unable to synchronize with a CDPD channel stream on the new RF channel, the RRME shall search another channel
2. If the response is a MAC-OPEN.confirm primitive, the RRME shall examine the quality of the channel as follows:
   A. The RRME shall examine the block error rate of the channel, based on the MAC-STATUS.indication primitive, for a time which shall be implementation dependent. If the block error rate is determined to be above a threshold which shall be implementation dependent, then the RRME shall search another channel.
   B. The RRME may optionally determine other measurements, such as the symbol error rate, and the sync word error rate.
   If the block error rate and other implementation-dependent criteria are acceptable, then the RRME shall terminate the search.
3. On receipt of a CHANNEL STREAM IDENTIFICATION message, the RRME shall then execute the Cell Transfer procedure defined in Section 3.3.12."

Many manufacturers have implemented the low power mode for in-coverage modem operation as specified above in the CDPD Specification. However, no current modem implementations provide similar battery life outside of the coverage area to that achieved while in full coverage. Similar problems exist with many of the other wireless standards and systems.

What the industry needs is a way for an RF wireless modem to go into a sleep mode while in a non-coverage area and still be responsive when the mobile user enters a coverage area.

SUMMARY OF THE INVENTION

The present invention is directed at addressing the above-mentioned shortcomings, disadvantages, and problems of the prior art. The present invention provides for a method for causing a radio frequency ("RF") modem to operate in a low power state when said modem is unable to register itself with a base station controller within said modem's coverage area, said modem comprising a central processing unit and a first and second timer, said method comprising the steps of: (a) setting a time duration for said first timer, wherein the time duration of said first timer is the maximum amount of time that said modem will attempt to register with a base station controller before entering into a low power state; (b) setting a time duration for said second timer, wherein the time duration of said second timer is the amount of time that said modem will operate in said low power state; (c) detecting that a connection to a base station controller is lost, and causing said first timer to start; (d) attempting to register said modem with base station controller; (e) causing said modem to operate in a normal modem active state if said modem registers with said base station controller before said first timer times out, and causing said second timer to start if said modem has failed to register with said base station controller at the point when said first timer times out; (f) causing said modem to operate in said low power state during the duration of said second timer; and (g) causing said modem to awaken from said low power state when said second timer times out and to return to step (c). Preferably the RF modem implementing this method operates using a Cellular Digital Packet Data standard. In addition, the timers used are preferably software programmable, said first timer is preferably set to a time to allow said modem to scan all available channels to locate service and said second timer is set to a time that is a multiple of said first timer. Moreover, the method of claim 1, may further comprise notifying an attached host computing device when said modem enters into said low power state and when said modem awakens from said low power state.

The present invention also provides for a method for causing a radio frequency ("RF") modem to operate in a low power state when said modem is unable to register itself with a base station controller within said modem's coverage area, said modem comprising a central processing unit, a first, second and third timer and a counter, said method comprising the steps of: (a) setting a time duration for said first timer, wherein the time duration of said first timer is the maximum amount of time that said modem will attempt to register with a base station controller before setting said counter and entering into a low power state; (b) setting a time duration for said second timer, wherein the time duration of said second timer is the amount of time that said modem will operate in said low power state; (c) setting a time duration for said third timer, wherein the time duration of said third timer is the maximum amount time said modem will attempt to register with a base station controller before returning to said low power state; (d) detecting that a connection to a base station controller is lost, and causing said first timer to start; (e) attempting to register said modem with a base station controller; (f) causing said modem to operate in a normal modem active state if said modem registers with said base station controller before said first timer times out, and causing said counter to be set if said modem has failed to register with said base station controller at the point when said first timer times out, wherein said counter is the maximum number of times said modem will operate in said low power state before it returns to step (d); (g) starting said second timer; (h) causing said modem to operate in said low power status during the duration of said second timer; (i) decrementing the value of said counter; (j) detecting if the value of counter said counter is zero; (k) causing said modem to awaken from said low power state and to return to step (d) if said counter value is zero, and causing said modem to awaken and said third timer to start if said counter value is greater than zero; (l) attempting to register said modem with a base station controller; (m) causing said modem to operate in a normal modem active state if said modem registers with said base station controller before said third timer times out and to return to step (f) if registration is subsequently lost, and causing said modem to return to step (g) if said modem has failed to register with said base station controller at the point when said third timer times out. Preferably the RF modem implementing this method operates using a Cellular Digital Packet Data standard. In addition, the timers and the counter used are preferably software programmable, said first timer is preferably set to a time to allow said modem to scan all available channels to locate service, said third timer is set to allow said modem to scan a subset of said available channels that is a list of preferred channels, and said second timer is set to a time that is a multiple of said third timer. Moreover, the method of claim 1, may further comprise notifying an attached host computing device when said modem enters into said low power state and when said modem awakens from said low power state.

The present invention also provides for a wireless radio frequency ("RF") modem, said modem having an antenna, an RF head, a baseband processing unit, a memory for storing modem operating system instructions, and a central processing unit ("CPU") for attempting to register said modem with a base station controller within said modem's coverage area and for detecting that a connection to a base station controller has been lost, the improvement comprising: a first timer coupled to said CPU that is set to a time duration that is the maximum amount of time that said modem will attempt to register with a base station controller before operating in a low power state; means coupled to said first timer for starting said first timer, said means responsive to a detection that a connection to a base station controller has been lost; a second timer coupled to said CPU that is set to a duration that is the amount of time that said modem will operate in said low power state; and means coupled to said second timer for starting said second timer, said means responsive to said first timer timing out; wherein said CPU is operative under the control of said operating system instructions to cause said modem to operate in a normal modem active state when said modem registers with a base station controller before said first timer times out, said CPU is further operative to cause said modem to operate in said low power state for the time duration of said second timer when said modem is unable to register itself with a base station controller before said first timer times out, and said CPU is further operative to cause said modem to awaken from said low power state and attempt to register with a base station controller at the point when said second timer timers out.

Finally, the present invention provides for a wireless radio frequency ("RF") modem, said modem having an antenna, an RF head, a baseband processing unit, a memory for storing modem operating system instructions, and a central processing unit ("CPU") for attempting to register said modem with a base station controller within said modem's coverage area and for detecting that a connection to a base station controller has been lost, the improvement comprising: a first timer coupled to said CPU that is set to a time duration that is the maximum amount of time that said modem will attempt to register with a base station controller before operating in a low power state; means coupled to said first timer for starting said first timer, said means responsive to a detection that a connection to a base station controller has been lost; a second timer coupled to said CPU that is set to a duration that is the amount of time that said modem will operate in said low power state; means coupled to said second timer for starting said second timer, said means responsive to said first timer timing out; a counter coupled to said CPU that is set to a value that is the maximum number of times said modem will operate in said low power state before restarting said first timer and attempting to register said modem with a base station controller; means coupled to said counter for setting and starting said counter, said means responsive to said first timer timing out; means coupled to said counter for detecting the value of said counter; a third timer coupled to said CPU that is set to a time duration that is the maximum amount of time that said modem will attempt to register with a base station controller before re-entering said low power state after sleeping for a time determined by said second timer; and means coupled to said third timer for starting said second timer, said means responsive to a detection that said counter is greater than zero; wherein said CPU is operative under the control of said operating system instructions to cause said modem to operate in a normal modem active state when said modem registers with a base station controller before said first timer times out, said CPU is further operative to cause said modem to operate in said low power state for the time duration of said second timer when said modem is unable to register itself with a base station controller before said first timer times out, said CPU is further operative when said counter value is zero to cause said modem to awaken from said low power state and to attempt to register with a base station controller at the point when said second timer timers out, said CPU is further operative to cause said modem to operate in a normal modem active state when said modem registers with a base station controller before said third timer times out, and said CPU is further operative to cause said modem to operate in said low power state for the time duration of said second timer when said modem is unable to register itself with a base station controller before said third timer times out.

An object of the present invention is to provide for a method and apparatus for extending battery life in an RF wireless modem by automatically commanding the RF modem into a low power, auto-sleep-no-coverage mode when coverage is not available.

A key advantage of the present invention is that the auto-sleep-no-coverage mode timing is configurable solely through software parameters in the operating system of the modem. Therefore, the invention does not require any change to the base station control software.

Another advantage of the present invention is that it conforms to the Cellular Digital Packet Data (CDPD) Specification and improves the standby time one would otherwise achieve by balancing the modem response time target, upon returning to a coverage area, with the standby time target. By using this invention, the standby time of the device outside the coverage area can approach the standby time of the device within the coverage area. Whereas, without this invention the standby time outside the coverage area is significantly reduced compared to the standby time within the coverage area. Thus, the present invention provides users with consistency of modem operational battery life in both coverage cases.

BRIEF DESCRIPTIONS OF THE DRAWINGS

The forgoing aspects and attendant advantages of this invention will become more readily appreciated by reference to the following detailed description, when taken in conjunction with the accompanying drawings, wherein.

DETAILED DESCRIPTION OF THE INVENTION

The present invention provides a method and apparatus to allow longer battery life in a radio frequency ("RF") wireless modem device by causing the device to operate in a low power sleep mode in areas of non-coverage. Embodiments of the present invention illustrate the RF modem cooperatively operating with a host computing device. However, those of ordinary skill in the art will realize that the present invention may also be practiced using a stand-alone modem.

Figure 1:
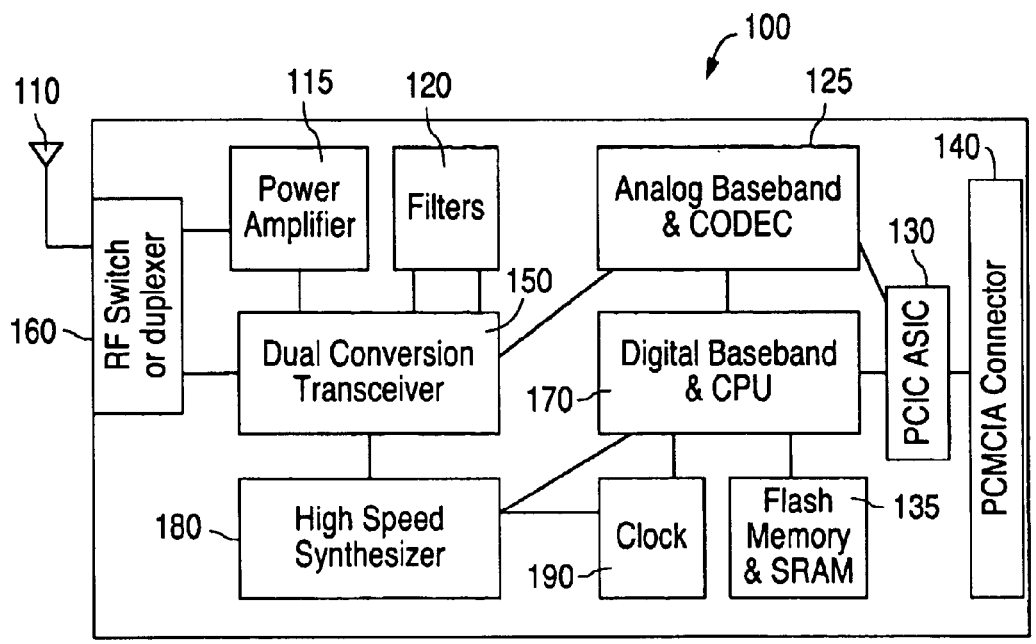
FIG. 1 is a schematic illustration of a prior art wireless RF modem that is designed to be plugged into a PCMCIA slot connector within a host computer and that can execute programmed instructions.

FIG. 1 is a schematic illustration of a prior art wireless RF modem 100 that is designed to be plugged into a PCMCIA slot connector within a host computer and that can execute programmed instructions. In this representation of prior art RF modem 100, a Dual Conversion Transceiver 150, a High Speed Synthesizer 180, a Power Amplifier 115, Filters 120, and an RF Switch 160 comprise an RF head, which performs RF conversion. Conventional versions of Dual Conversion Transceiver 150 and High Speed Synthesizer 180 are available from Texas Instruments of Dallas, Tex. RF switch 160 may be a transmit/receive switch or a duplexer, as required by a given air standard.

An analog Baseband and Codec 125 and a Digital Baseband and CPU 170 work in conjunction with a Flash Memory and SRAM 135 and comprise the baseband processing unit and the CPU, which performs baseband processing and protocol stack control. Analog Baseband and Codec 125 and Digital Baseband and CPU 170 are available from Analog Devices of Norwood, Mass. RF modem 100 also includes an Antenna 110, a Clock 190, a PCIC (personal computer I/O card) ASIC 130, and a PCMCIA connector 140. The above components of RF modem 100 are electrically connected as illustrated by the solid lines in FIG. 1 between those components.

RF modem 100 operates as follows. In the receive mode, an electromagnetic RF signal is received at Antenna 110 which is connected to RF switch 160. The received RF signal is routed through RF switch 160 to Dual Conversion Transceiver 150, which converts the RF signal into a modulated baseband analog signal for baseband processing. Dual Conversion Transceiver 150 operates using various receive and transmit variable frequency oscillator signals that are provided by High Speed Synthesizer 180. The modulated RF signal from Dual Conversion Transceiver 150 is fed to Power Amplifier 115 which also is fed a signal that controls the power output so that Power Amplifier 115 can deliver requested power to RF Switch 160. Various filters as required for Dual Conversion Transceiver 150 are shown as Filters 120. The modulated baseband analog signal from Dual Conversion Transceiver 150 is fed into Analog Baseband and Codec 125 for proper demodulation to extract data bits comprising true data, which is representative of the information being received, protocol bits of data, and any security coding. Digital Baseband and CPU 170 further processes the received signal by executing a protocol stack software program, to separate the true data from the protocol data and to remove any security coding. Digital Baseband and CPU 170 then sends the true data through a timing and interface PCIC ASIC device 130 to PCMCIA connector 140 to be fed to a host computer. Clock 190 provides a system clock to Digital Baseband and CPU 170 and High Speed Synthesizer 180. Flash Memory and SRAM 135 provide for program storage and variable storage for Digital Baseband and CPU 170, e.g., storing the protocol stack software program.

In the transmit mode, true data to be transmitted is fed through PCMCIA Connector 140, through PCIC ASIC 130, to Digital Baseband and CPU 170, wherein the true data is wrapped with protocol data and any necessary security data and sent to Analog Baseband and Codec 125. Analog Baseband and Codec 125 generates the modulated baseband analog signal and sends it to Dual Conversion Transceiver 150 to generate the electromagnetic RF signal. The RF signal to be transmitted is then amplified by Power Amplifier 115 and sent through RF switch 160 to Antenna 110 for transmission. As illustrated in FIG. 1, prior art RF modem 100 has its own CPU and its own memory, and all modem functions are performed and controlled by components housed within RF modem 100.

If modem 100 operates using the CDPD standard, for example, CPU 170 would typically have two power modes, a normal ("awake") power mode and a low power asleep ("sleep") mode. The sleep mode significantly reduces power consumption until CPU 170 is again awakened. CPU 170 would execute modem operating system instructions, which are typically programmed during manufacturing, to place modem 100 into the awake mode or the low power sleep mode, and CPU 170 may also execute programmed instructions to notify an attached host computing device that the modem is going into the low power sleep mode. The notified host computing device may or may not go into its own sleep mode depending on how it is programmed. Upon reaching the programmed time to sleep, CPU 170 awakens, wherein it is interrupted from its low power mode and executes instructions to restore power to the rest of modem 100. Modem 100 may notify any attached host computing device that the modem has awakened. The notified device may or may not take its own actions depending on the notification and depending on how the attached computing device is programmed. Typically, CPU 170 also attempts to register modem 100 with a base station controller and detects when a connection to a base station controller does not exist or has been lost.

CPU 170 may also be programmable to perform a preferred-list (or "hot-list") scan followed by a selected-type scan chosen from one (1) of four (4) types of channel scans for service called: Prefer-A, Prefer-B, A-only, and B-only. In CDPD, for example, there are 1024 channels that are split into an A-Side and a B-side, wherein the channels are split into group A from Carrier A and group B from Carrier B. The preferred-list utilizes a list of known good channels that modem 100 has previously registered on as a subset of the entire channel band for CDPD. Since this preferred-list search is a small list of channels, typically ten (10), the time allotted for the search can be very small. Prefer-A starts the channel scan on the group of 512 total channels known as Side-A. If after this scan modem 100 is not registered, the remaining 512 channels on Side-B are scanned for coverage. Prefer-B starts with Side-B channels and then does Side-A if needed. A-only scans A-Side channels only, and B-only scans B-Side channels only.

For example, it typically takes 120 seconds to search 1024 channels. Therefore, an A-side or B-side search would typically take 60 seconds. The preferred channel list, which is typically maintained in memory 135 of modem 100 as the last ten (10) channels that modem 100 has seen service on or has registered on, can generally be scanned in as little as 15 seconds.

If operating under the CDPD standard, most of the operation of RF wireless modem 100 is defined in the CDPD Specification as described above. Accordingly, modem 100 would operate in the sleep mode for in-coverage usage in accordance with Section 6.8, pub. 403 at pages 58 through 62. Modem 100 would further operate while out of the coverage area in accordance with Section 3.3.9 of the CDPD Specification in pub. 405 at pages 28 through 31.

The in-coverage sleep mode is a coordinated low power mode available and requested from the current CDPD base stations. This in-coverage sleep mode is coordinated in that the modem device and the base station that the device is registered to coordinates when the device will enter this low power mode so that data communication can still take place when the device wakes up again. The CDPD Specification defines this and a series of timing parameters that are used by the device to maintain this coordination. When modem 100 is outside of the coverage area, it performs a channel scanning algorithm that attempts to find service again. Although not specifically mandated in the Specification, typically the unit would stay in this channel scanning mode until coverage is found again or the unit is turned off by the mobile user.

Figure 2:
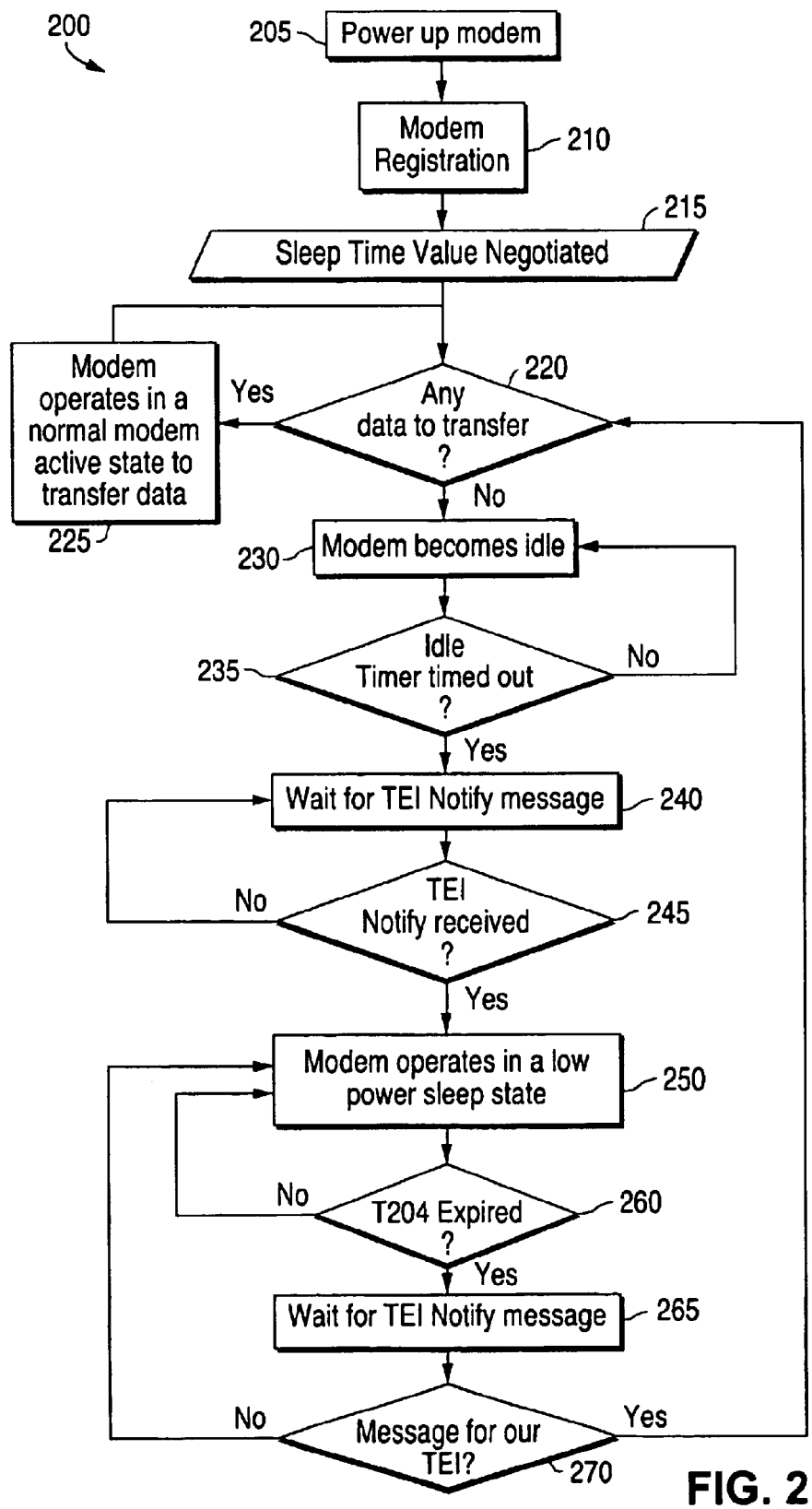
FIG. 2 is a flow diagram illustrating a method for operating a prior art RF modem in a low power sleep state in a coverage area in a CDPD system.

FIG. 2 is a flow diagram illustrating a method 200 for operating a prior art RF modem in a coverage area in a CDPD system. The modem is powered up, at step 205, and is registered with a base station controller, at step 210. Typically, a single sleep timer value is negotiated (or agreed-upon) with the base station controller, at step 215. The sleep timer value is negotiated as follows. After the modem is powered up, it requests a value for the sleep timer from the base station controller. The timer value is allowed if it is less than a maximum value set by the base station controller. If the timer value exceeds the maximum value, the base station suggests an alternate sleep timer value to the modem. This process continues until an optimal sleep timer value ("T204") is agreed upon.

If the modem detects at, step 220, that there is data to transfer, the modem operates in its normal modem active state to transfer data, at step 225, until the modem detects, at step 220, that there is no more data to transfer. The modem then becomes idle, at step 230, and operates in this idle state until it detects, at step 235, that an idle timer has timed out. The modem then waits for a TEI (temporary equipment identifier) Notify message, at step 240, until the modem detects, at step 245, that the TEI message was received, wherein the modem operates in a sleep mode for the time T204 by executing a command to go to low power, at step 250. T204 is the sleep timer previously negotiated with the base station controller at step 215.

Once, timer T204 has timed out at step 260, the modem awakens to full power and waits for a TEI Notify message, at step 265, and if no TEI message is received, at step 270, method 200 returns to step 250. If there was a TEI message, method 200 returns to step 220. This tight control of the modem sleep time provides for efficient battery usage in the prior art but only if the modem remains in a coverage area. If the modem leaves coverage, then it tries to establish registration again and it is in this latter mode that the prior art allows for excessive battery consumption, as illustrated in FIG. 3.

Figure 3:
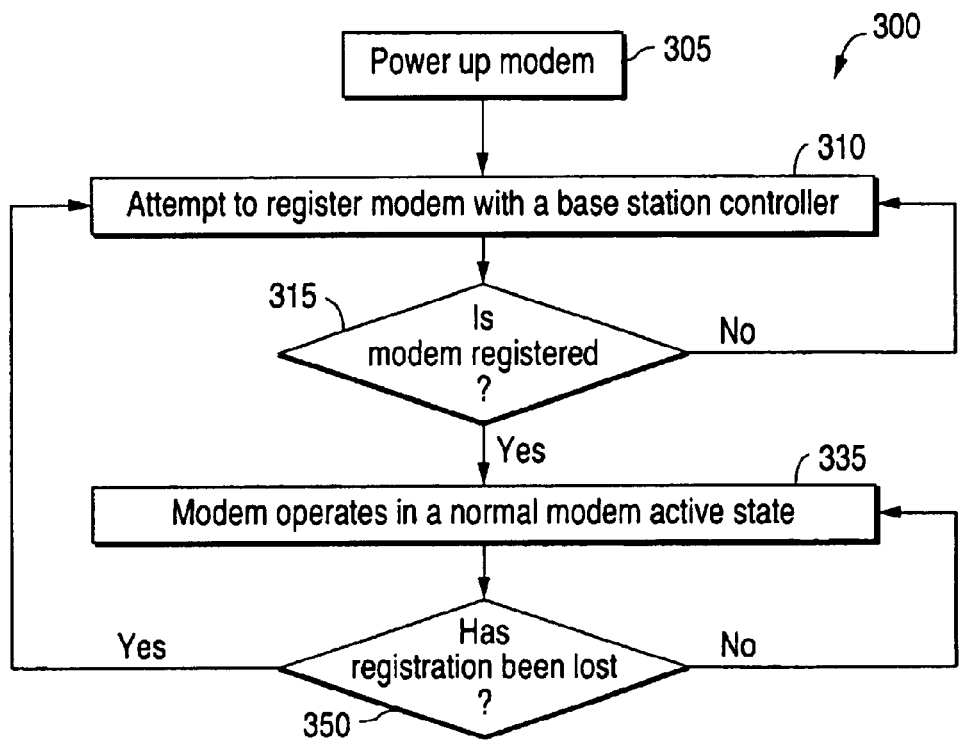
FIG. 3 is a flow diagram illustrating a method for operating a prior art RF modem in a non-coverage area in a CDPD system.

FIG. 3 is a flow diagram illustrating a method 300 for operating a prior art modem in a non-coverage area in a CDPD system. If the modem was already powered up, but lost registration, method 300 begins at step 310, otherwise method 300 begins at step 305 with the modem being powered up. At step 310, the modem attempts to register with a base station controller until either: (1) the modem detects, at step 315, that it has successfully registered with a base station controller, wherein the modem operates in a normal modem active state, at step 335; (2) the user turns off the modem; or (3) the battery supplying the modem goes dead. This is a serious problem with the prior art practice in a non-coverage area upon modem start up or upon leaving a coverage area in which the modem was registered. Once the modem registers and begins normal operation, it continues normal operation until it detects, at step 340, that registration has been lost, wherein method 300 returns to step 310.

Figure 4:
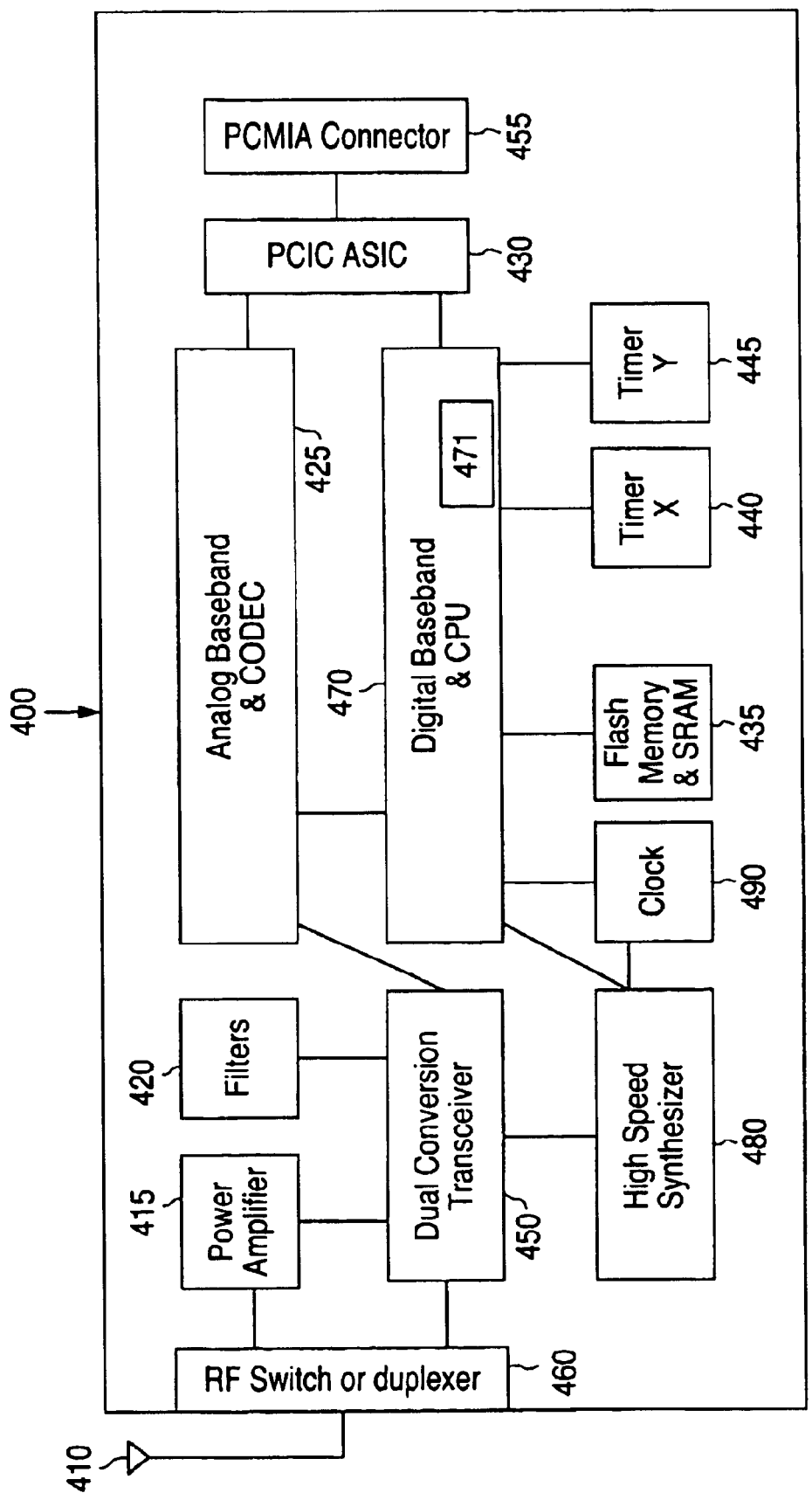
FIG. 4 is a schematic illustration of a wireless RF modem according to one embodiment of the present invention, which uses two timers.

FIG. 4 is a schematic illustration of a wireless RF modem 400 according to one embodiment of the present invention, which uses two timers. In this representation of RF modem 400, a Dual Conversion Transceiver 450, a High Speed Synthesizer 480, a Power Amplifier 415, Filters 420, and an RF Switch 460 are all conventional components such as those described above with respect to FIG. 1, which comprise an RF head for performing RF conversion. An analog Baseband and Codec 425 and a Digital Baseband and CPU 470 work in conjunction with a Flash Memory and SRAM 435 and are also all conventional components such as those described above with respect to FIG. 1, which comprise the baseband processing unit and the CPU for performing baseband processing and protocol stack control. RF modem 400 also includes an Antenna 410, a Clock 490, a PCIC ASIC 430, and a PCMCIA connector 455, also conventional components such as those described above with respect to FIG. 1. The above components of RF modem 400 are electrically connected as illustrated by the solid lines in FIG. 4 between those components. Modem 400 connects to a host computing device (not illustrated) via PCMCIA connector 455.

RF modem 400 further comprises two timers coupled to CPU 470, a Timer X (component 440) and a Timer Y (component 445) that are industry standard components and preferably software programmable. Timer X, a registration time timer, is set to a value that is the maximum time allowed to try to register modem 400 with a base station controller, i.e. the maximum time the unit will search for service in a non-coverage area before entering a low power sleep mode. Timer Y, a sleep time timer, is set to a value that is the time that modem 400 will operate in this low power sleep mode. Preferably, Timers X and Y are set during manufacturing of modem 400 using conventional methods. However, as understood by those of ordinary skill in the art, Timer X and Timer Y may be set, for instance, by a user of an attached host computing device.

Timer X and Timer Y are illustrated in FIG. 4 as separate components, but those skilled in the art will realize that these timers can be included within CPU 470. Moreover, Timer X and Timer Y may be may be started using any number of conventional means that may be located within each timer, within CPU 470 (as illustrated in FIG. 4 as component 471), or as a separate component within modem 400. Compared to the prior art shown in FIG. 1, by setting values for Timer X and Timer Y, a user can extend battery life over what would be experienced with the prior art in a non-coverage area, wherein the modem is on and trying to register the entire time.

Figure 5:
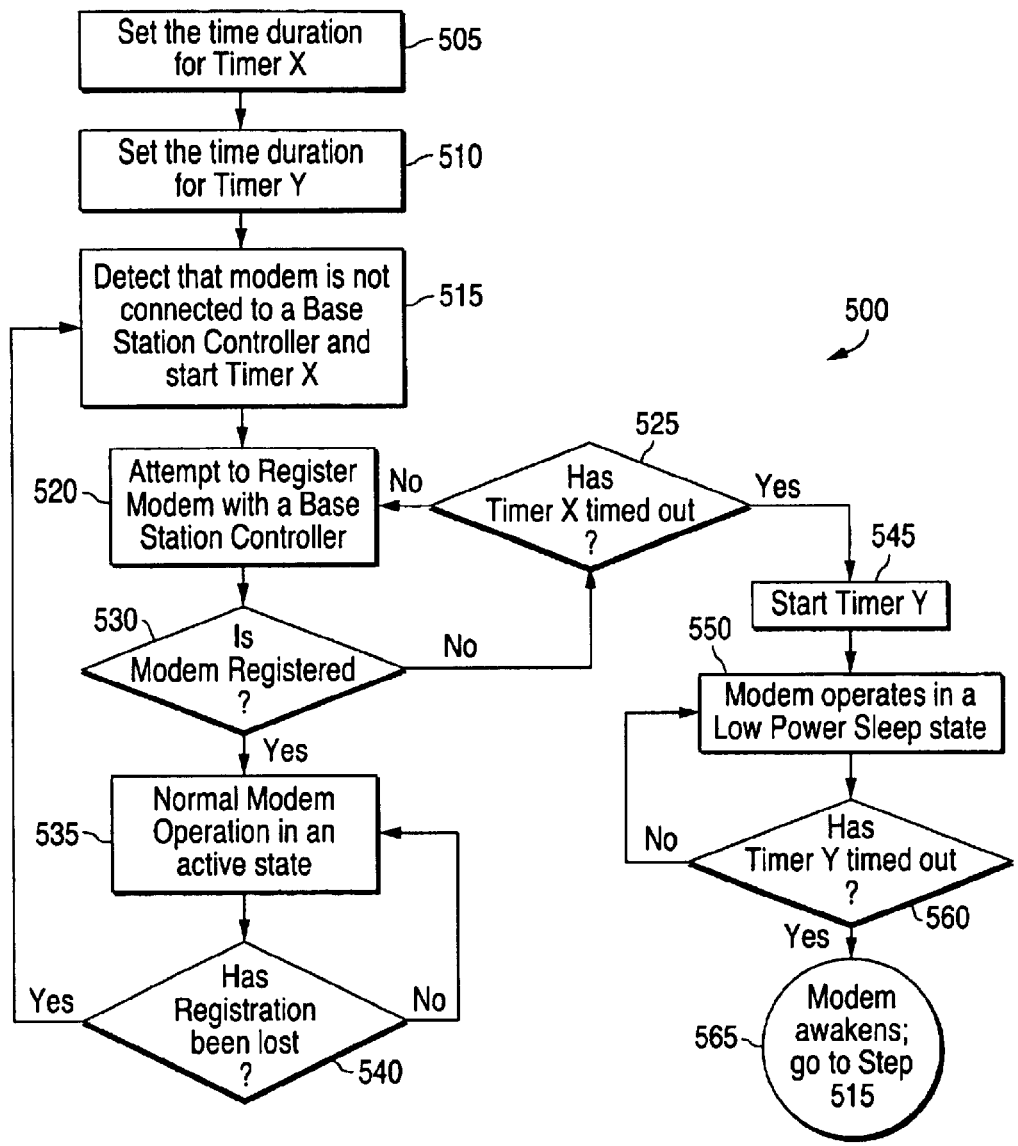
FIG. 5 is a flow diagram illustrating a method according to one embodiment of the present invention for operating the RF modem of FIG. 4 in a low power sleep mode, in a non-coverage area in a CDPD system.

FIG. 5 is a flow diagram illustrating a method 500 according to one embodiment of the present invention for operating the RF modem of FIG. 4 in a low power sleep mode in a non-coverage area in a CDPD system. The time duration for Timer X and for Timer Y is set, at steps 505 and 510, respectively. Once the modem detects that it is not connected to a base station controller, it starts Timer X, at step 515. This detection may arise either upon initial power up of the modem or if the modem loses registration with a base station controller to which it was connected. The modem, at step 520, then attempts to register with a base station controller. The modem continues to try to register itself until either it is registered, at step 530, or Timer X times out, at step 525. If modem registration is successful, the modem operates in a normal modem active state, at step 535, until the modem detects, at step 540, that modem registration has been lost. Upon loss of registration, method 500 returns to step 515. Normal modem operations include the modem's normal interactions with the base station controller and its in-coverage low power sleep mode function as described above. If Timer X times out, at step 525, the modem starts Timer Y at step 545, and operates in a low power sleep state at step 550, until Timer Y times out at step 560. Step 550 may also include the modem notifying the attached host computing device that the modem is entering into the low power sleep mode. The notified device may or may not enter and operate in a low power sleep mode, depending on how the attached device is programmed. When Timer Y times out, the modem awakens from its low power sleep state, at step 565, and method 500 returns to step 515. The modem may notify an attached host computing device, at step 565, that it has awakened. The notified device may or may not take its own actions depending upon the type of notification given and depending upon how the attached host computing device is programmed.

One can compare the two timer embodiment of the present invention to the prior art methodology shown in FIG. 3 and realize that, in prior art devices, power is continuously expended at normal levels when the modem is in a non-coverage area. However, the modem according to the present invention is sleeping for a time determined by Timer Y, and the modem does not consume as much power while in this low power state. To realize the benefit of this embodiment of the current invention, the time duration of Timer Y is preferably set to some multiple of the time duration of Timer X. Timer X is preferably set to a time that is long enough to allow the modem to perform a complete channel scan to locate service if the mobile user moves to a coverage area that is a different cell or moves to an entirely different geographical area. In addition, Timer Y is set to allow the modem to operate in a low power sleep mode for a considerable amount of time. A preferable duration for Timer X is 120 seconds and for Timer Y is 1200 seconds.

For prior art RF wireless modems available for CDPD service, the typical current draw when not in sleep mode is 140 milliamps and is only 12 milliamps in sleep mode. When in negotiated sleep mode in a coverage area, the battery life is typically about 22 hours. In prior art devices operating in a non-coverage area, the battery life is typically only 6 hours. However, using the embodiment of the present invention as illustrated in FIGS. 4 and 5, the battery life can be extended to at least 18 hours.

Table 1a. lists the preferred Timer settings (in seconds) for search selections Prefer-A, Prefer-B, A-Only, and B-Only, for the two time embodiment of the current invention.

TABLE 1a

| (Option) | Timer X | Timer Y |
|---|---|---|
| Prefer-A | 120 | 1200 |
| Prefer-B | 120 | 1200 |
| A-Only | 60 | 600 |
| B-Only | 60 | 600 |

According to this embodiment, users in a fringe area, wherein they are entering and leaving coverage from the same cell, would experience a significantly improved performance in battery life over that achieved with the prior art. However, a latency may be seen that is less than optimal, the latency being equal to the time duration of Timer Y. Therefore, in a preferred embodiment of the present invention, in addition to having a Timer X and a Timer Y, a third timer, Timer Z, is added along with a Counter C as is shown in FIG. 6.

Figure 6:
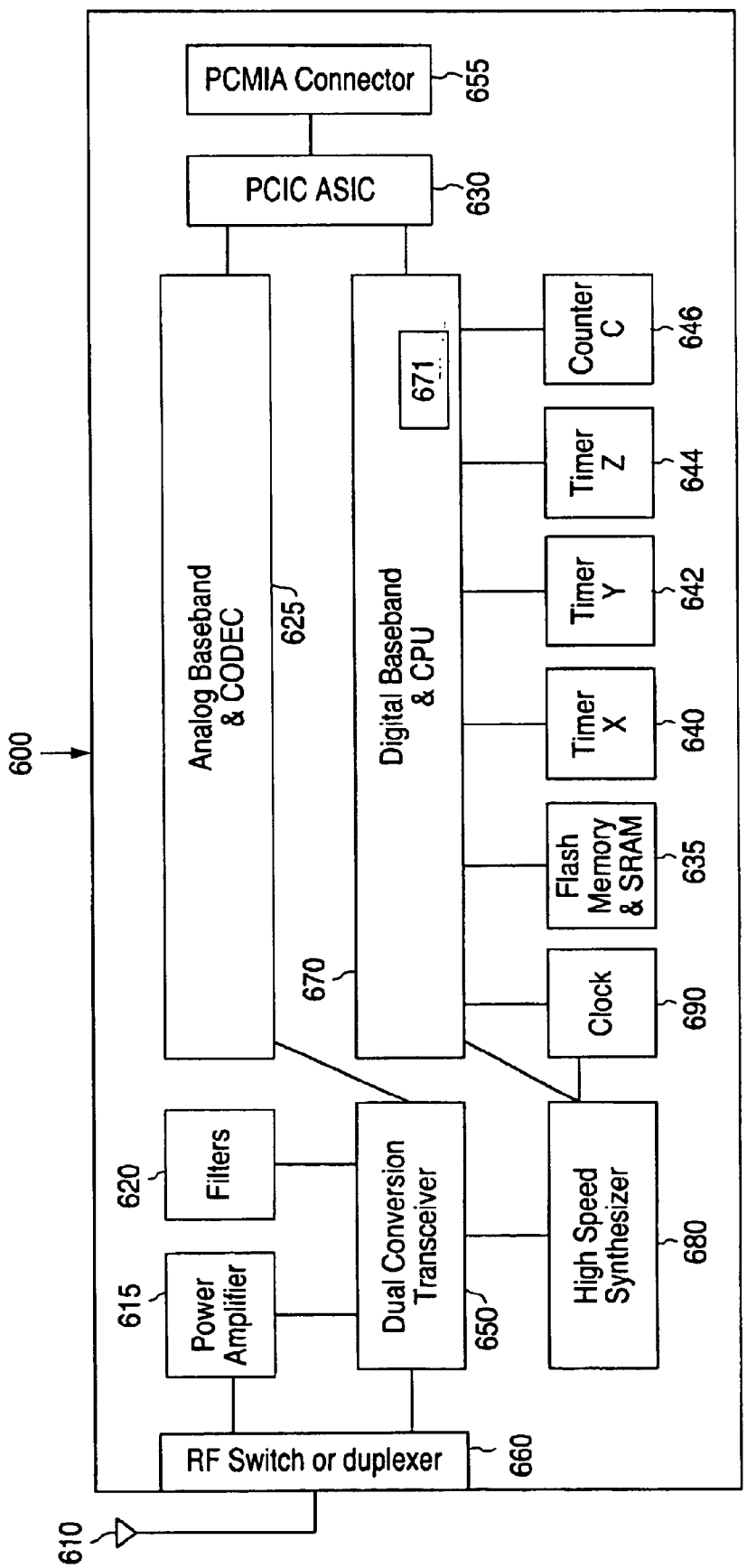
FIG. 6 is a schematic illustration of a wireless RF modem according to a preferred embodiment of the present invention, which uses three timers and a counter.

FIG. 6 is a schematic illustration of a wireless RF modem according to a preferred embodiment of the present invention, which uses three timers and a counter. In this representation of RF modem 600, a Dual Conversion Transceiver 650, a High Speed Synthesizer 680, a Power Amplifier 615, Filters 620, and an RF Switch 660 are all conventional components such as those described above with respect to FIG. 1, which comprise an RF head for performing RF conversion. An analog Baseband and Codec 625 and a Digital Baseband and CPU 670 work in conjunction with a Flash Memory and SRAM 635 and are also all conventional components such as those described above with respect to FIG. 1, which comprise the baseband processing unit and the CPU for performing baseband processing and protocol stack control. RF modem 600 also includes an Antenna 610, a Clock 690, a PCIC ASIC 630, and a PCMCIA connector 655, also conventional components such as those described above with respect to FIG. 1. The above components of RF modem 600 are electrically connected as illustrated by the solid lines in FIG. 6 between those components. Modem 600 connects to a host computing device (not illustrated) via PCMCIA connector 655.

Modem 600 further comprises three timers, a Timer X (component 640), a Timer Y (component 642) and a Timer Z (component 644) and a Counter C (component 646) coupled to CPU 670. Timers X, Y and Z and Counter C are preferably industry standard components that are software programmable. Timer X determines the maximum amount of time the unit will search for service before entering into the low power sleep mode. Timer Y determines the time the unit will spend in the low power sleep mode. Timer Z determines the maximum time modem 600 will attempt to register with a base station controller after sleeping for a time determined by Timer Y. Timer Z is preferably set to a value that is less than the time value of Timer X, so that modem 600 can register quickly if it, for example, comes into coverage in the same cell as when it was last registered. Finally, Counter C is preferably set to an integer value ("N") that determines the number of times modem 600 will stay in a short cycle loop controlled by Timer Y and Timer Z, wherein modem 600 will attempt to register with a base station controller and then will enter into a low power sleep mode if Timer Z times out before there is a successful registration.

Timer X, Timer Y and Timer Z are preferably set during manufacturing of the RF modem using conventional methods. However, as understood by those of ordinary skill in the art, Timer X, Timer Y and Timer Z may be set, for instance, by a user of an attached host computing device. In addition, Timer X, Timer Y, and Timer Z may be started using any number of conventional means that may be located within each timer, within CPU 670 (as illustrated in FIG. 6 as component 671) or as a separate component within modem 600. Counter C is set and started using any number of conventional means that may be located within the counter, within CPU 670 (as illustrated in FIG. 6 as component 671) or as a separate component within modem 600. Timer X, Timer Y, Timer Z and Counter C are illustrated in FIG. 6 as separate components, but those skilled in the art will realize that Timer X, Timer Y, Timer Z and Counter C can be included within CPU 670.

Figure 7:
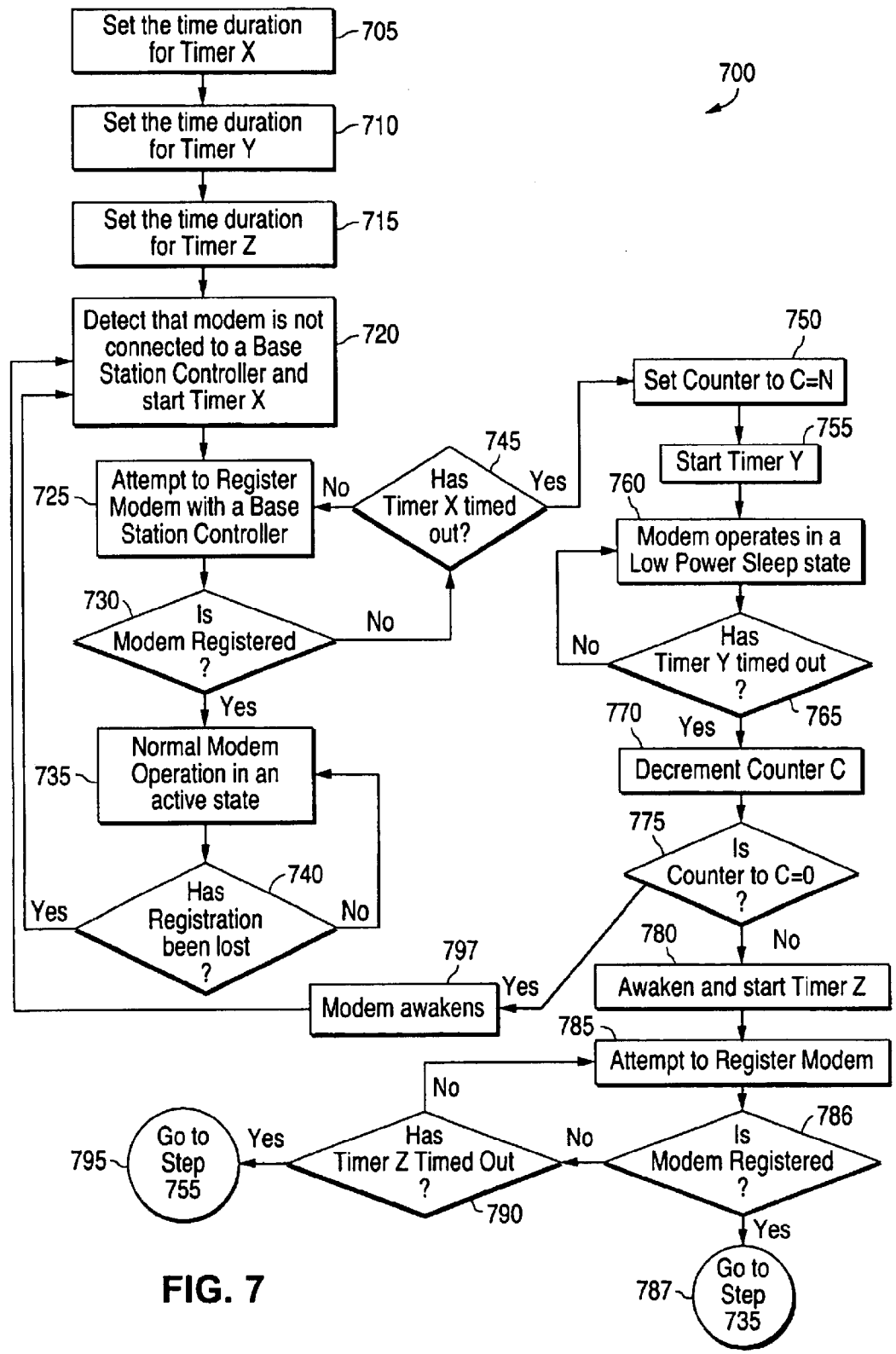
FIG. 7 is a flow diagram illustrating a method according to a preferred embodiment of the present invention for operating the RF modem of FIG. 6 in a low power sleep mode in a non-coverage area in a CDPD system.

FIG. 7 is a flow diagram illustrating a method 700 according to a preferred embodiment of the present invention for operating the RF modem of FIG. 6 in a low power sleep mode in a non-coverage area in a CDPD system. The time duration for Timer X, Timer Y and Timer Z is set at steps 705, 710 and 715, respectively. At step 720, the modem detects that it is not connected to a base station controller, and starts Timer X. This detection may arise either upon initial power up of the modem or if the modem loses registration with a base station controller to which it was currently connected. The modem, at step 725, then attempts to register with a base station controller until either it becomes registered, at step 730, or Timer X times out, at step 745. If the modem becomes registered, it operates in a normal modem active state, at step 735. Normal modem operations include the modem's normal interactions with the base station controller and the modem's in-coverage low power sleep mode function as described above. The modem continues normal operation until it detects, at step 740, that registration with the base station controller has been lost, then method 700 returns to step 720. If Timer X times out, Counter C is set to "N" and started at step 750. The modem starts Timer Y, at step 755, and operates in a low power sleep mode, at step 760, until Timer Y times out, at step 765. Step 760 may also include notifying an attached host computing device that the modem has entered into the sleep mode. The notified device may or may not go into its own sleep mode depending on how that device is programmed. When Timer Y times out, Counter C is decremented preferably by a value of one ("1") at step 770. If the modem detects, at step 775, that Counter C is equal to zero ("0"), the modem awakens to a normal modem active state, at step 797, and method 700 returns to step 720. If the modem detects, at step 775, that counter C is greater than zero ("0"), the modem awakens to a normal modem active state and starts Timer Z, at step 780. Steps 780 and 797 may also include notifying the attached host computing device that the modem has awakened. The notified device may or may not take its own actions depending upon the type of notification received and depending upon how the attached device is programmed. The modem attempts to register with a base station controller, at step 785, until either the modem is registered, at step 786, or until Timer Z times out, at step 790. If the modem is successfully registered, method 700 returns to step 735, at step 787. However, if Timer Z times out, method 700 returns to step 755, at step 795.

The time values for timers X, Y, Z and the count N for Counter C are preferably chosen to meet the performance requirements of the device while balancing response time vs. battery life. If the time duration for Timer Y is made very large, then the time spent in the low power state is very large and a significant increase in standby time is enjoyed. However, it will mean that if the user returns to the previous coverage area, the modem will not be able to communicate within the coverage area until Timer Y expires. This may limit the modem response time to inbound data communication requests. In essence, the user remains out-of-service for the time determined by Timer Y even if the modem has returned to a known good coverage area. Another timer balancing occurs between timers X and Z. The time duration for Timer X is preferably chosen to allow the modem to scan the entire band of channels at least once so that the modem is given the best opportunity possible to find service in the area before entering into a low power non-coverage sleep mode of operation. The time duration for Timer Z is preferably chosen as something less than that of Timer X, such that the device has time to scan only a subset of the entire channel band before re-entering the low power non-coverage sleep mode. Timer Z is typically chosen to be as small as possible to maximize battery life. The modem may encounter a problem in situations where it enters this low power non-coverage mode of operation and is then transported to a new geographical area where service is available on a channel not within the subset typically scanned in time Z. Therefore, the count N for Counter C is typically chosen to ensure that the modem always returns to start Timer X to allow sufficient time to scan the entire band.

One implementation of the preferred embodiment of the present invention, as illustrated by FIGS. 6 and 7, uses a typical time value for Timer X of 120 seconds, for Timer Y of 600 seconds, and for Timer Z of 60 seconds. Counter C is preferably chosen to have a count of 3. According to this implementation, users in a fringe area, wherein they are entering and leaving coverage from the same cell, would experience satisfactory performance in battery life and see a latency slightly improved compared to the previous embodiment illustrated by FIGS. 4 and 5, which uses only two timers.

Table 1b. lists the typical Timer settings (in seconds) for search selections Prefer-A, Prefer-B, A-Only, and B-Only, for this implementation of the preferred embodiment, which has three timers and one counter.

TABLE 1b

| (Option) | Timer X | Timer Y | Timer Z | Counter C |
| --- | --- | --- | --- | --- |
| Prefer-A | 120 | 600 | 60 | 3 |
| Prefer-B | 120 | 600 | 60 | 3 |
| A-Only | 60 | 600 | 60 | 3 |
| B-Only | 60 | 600 | 60 | 3 |

The preferred implementation of the preferred embodiment illustrated in FIGS. 6 and 7 uses a preferred-list (hot-list) channel search during the time duration of Timer Z that is significantly smaller than the entire channel band that is searched during the time duration of Timer X. This preferred-list channel search utilizes a list of known good channels that the modem has previously registered on, which is a subset of the entire channel band. Since this preferred channel search is a small list of channels, the time allotted during the time duration of Timer Z to search those channels can be very small, and this also allows the time duration of Timer Y to be smaller. For example, assume it takes 120 seconds to search 1024 channels. A preferred channel list is preferably maintained of the last 10 channels on which the modem has seen service or has been registered. The time duration of Timer Z may be set to 15 seconds to provide sufficient time to search these 10 preferred channels. Since the battery improvements dictate that the time value of Timer Y be 10 times that of Timer Z, the time duration of Timer Y can now be set to 150 seconds or just under 3 minutes. This improvement means that the response to coming back into coverage is detected in 3 minutes, rather than 10 minutes as defined in the previously discussed 3 timer, one counter implementation. This improvement in response is desirable.

Table 1c lists the typical Timer settings (in seconds) for search selections Prefer-A, Prefer-B, A-Only, and B-Only, for the preferred implementation of the present invention, which has three timers and one counter, and where a preferred-list (hot-list) scan is used.

TABLE 1c

| (Option) | Timer X | Timer Y | Timer Z | Counter C |
|---|---|---|---|---|
| Prefer-A | 120 | 150 | 15 | 3 |
| Prefer-B | 120 | 150 | 15 | 3 |
| A-Only | 60 | 150 | 15 | 3 |
| B-Only | 60 | 150 | 15 | 3 |

The standard of CDPD was chosen as an illustrative example of the present invention. The low power non-coverage sleep mode method of the present invention will work to improve battery life no matter what wireless standard is being used for the RF wireless data modem. The embodiments of the present invention described above are illustrative of the principles of the invention and are not intended to limit the invention to the particular embodiments described. Other embodiments of the present invention can be adapted for voice over the wireless Internet, communications over wireless standards other than CDPD, and may even be adapted to control the sleep mode of a PDA or other computing system to which the modem is attached. The RF modem may also be a stand-alone modem. Accordingly, while the preferred embodiment of the invention has been illustrated and described, it will be appreciated that various changes can be made therein without departing from the spirit and scope of the invention.

What is claimed is:

1. A method for causing a radio frequency ("RF") modem to operate in a low power state when said modem is unable to register itself with a base station controller within said modem's coverage area, said modem comprising a central processing unit and a first and second timer, said method comprising the steps of:
    (a) setting a time duration for said first timer, wherein the time duration of said first timer is the maximum amount of time that said modem will attempt to register with a base station controller before entering into a low power state;
    (b) setting a time duration for said second timer, wherein the time duration of said second timer is the amount of time that said modem will operate in said low power state;
    (c) detecting that a connection to a base station controller is lost, and causing said first timer to start;
    (d) attempting to register said modem with base station controller;
    (e) causing said modem to operate in a normal modem active state if said modem registers with said base station controller before said first timer times out, and causing said second timer to start if said modem has failed to register with said base station controller at the point when said first timer times out;
    (f) causing said modem to operate in said low power state during the duration of said second timer; and
    (g) causing said modem to awaken from said low power state when said second timer times out and to return to step (c).

2. The method of claim 1, wherein said modem operates using a Cellular Digital Packet Data standard.

3. The method of claim 1, wherein said first timer is set to a time to allow said modem to scan all available channels to locate service and said second timer is set to a time that is a multiple of said first timer.

4. The method of claim 1, wherein said first timer is set for 120 seconds and said second timer is set for 1200 seconds.

5. The method of claim 1, wherein said first timer is set for 60 seconds and said second timer is set for 600 seconds.

6. The method of claim 1, further comprising notifying an attached host computing device when said modem enters into said low power state and when said modem awakens from said low power state.

7. The method of claim 1, wherein said first and second timers are software programmable timers.

8. A method for causing a radio frequency ("RF") modem to operate in a low power state when said modem is unable to register itself with a base station controller within said modem's coverage area, said modem comprising a central processing unit, a first, second and third timer and a counter, said method comprising the steps of:
    (a) setting a time duration for said first timer, wherein the time duration of said first timer is the maximum amount of time that said modem will attempt to register with a base station controller before setting said counter and entering into a low power state;
    (b) setting a time duration for said second timer, wherein the time duration of said second timer is the amount of time that said modem will operate in said low power state;
    (c) setting a time duration for said third timer, wherein the time duration of said third timer is the maximum amount time said modem will attempt to register with a base station controller before returning to said low power state;
    (d) detecting that a connection to a base station controller is lost, and causing said first timer to start;
    (e) attempting to register said modem with a base station controller;
    (f) causing said modem to operate in a normal modem active state if said modem registers with said base station controller before said first timer times out, and causing said counter to be set and started if said modem has failed to register with said base station controller at the point when said first timer times out, wherein said counter is the maximum number of times said modem will operate in said low power state before it returns to step (d);
    (g) starting said second timer;
    (h) causing said modem to operate in said low power status during the duration of said second timer;
    (i) decrementing the value of said counter;
    (j) detecting if the value of counter said counter is zero;
    (k) causing said modem to awaken from said low power state and to return to step (d) if said counter value is zero, and causing said modem to awaken and said third timer to start if said counter value is greater than zero;
    (l) attempting to register said modem with a base station controller;
    (m) causing said modem to operate in a normal modem active state if said modem registers with said base station controller before said third timer times out and to return to step (f) if registration is subsequently lost, and causing said modem to return to step (g) if said modem has failed to register with said base station controller at the point when said third timer times out.

9. The method of claim 8, wherein said modem operates using a Cellular Digital Packet Data standard.

10. The method of claim 8, wherein said first timer is set to a time to allow said modem to scan all available channels to locate service, said third timer is set to allow said modem to scan a subset of said available channels, and said second timer is set to a time that is a multiple of said third timer.

11. The method of claim 10, wherein said subset of available channels is a list of preferred channels.

12. The method of claim 8, wherein said first timer is set for 120 seconds, said second timer is set for 600 seconds, said third timer is set for 60 seconds and said counter is set to a value of three.

13. The method of claim 8, wherein said first timer is set for 60 seconds, said second timer is set for 600 seconds, said third timer is set for 60 seconds and said counter is set to a value of three.

14. The method of claim 8, wherein said first timer is set for 120 seconds, said second timer is set for 150 seconds, said third timer is set for 15 seconds and said counter is set to a value of three.

15. The method of claim 8, wherein said first timer is set for 60 seconds, said second timer is set for 150 seconds, said third timer is set for 15 seconds and said counter is set to a value of three.

16. The method of claim 8, further comprising notifying an attached host computing device when said modem enters into said low power state and when said modem awakens from said low power state.

17. The method of claim 8, wherein said counter and said first, second and third timers are software programmable.

18. A wireless radio frequency ("RF") modem, said modem having an antenna, an RF head, a baseband processing unit, a memory for storing modem operating system instructions, and a central processing unit ("CPU") for attempting to register said modem with a base station controller within said modem's coverage area and for detecting that a connection to a base station controller has been lost, the improvement comprising:

a first timer coupled to said CPU that is set to a time duration that is the maximum amount of time that said modem will attempt to register with a base station controller before operating in a low power state;

means coupled to said first timer for starting said first timer, said means responsive to a detection that a connection to a base station controller has been lost;

a second timer coupled to said CPU that is set to a duration that is the amount of time that said modem will operate in said low power state; and means coupled to said second timer for starting said second timer, said means responsive to said first timer timing out;

wherein said CPU is operative under the control of said operating system instructions to cause said modem to operate in a normal modem active state when said modem registers with a base station controller before said first timer times out, said CPU is further operative to cause said modem to operate in said low power state for the time duration of said second timer when said modem is unable to register itself with a base station controller before said first timer times out, and said CPU is further operative to cause said modem to awaken from said low power state and attempt to register with a base station controller at the point when said second timer timers out.

19. A wireless radio frequency ("RF") modem, said modem having an antenna, an RF head, a baseband processing unit, a memory for storing modem operating system instructions, and a central processing unit ("CPU") for attempting to register said modem with a base station controller within said modem's coverage area and for detecting that a connection to a base station controller has been lost, the improvement comprising:

a first timer coupled to said CPU that is set to a time duration that is the maximum amount of time that said modem will attempt to register with a base station controller before operating in a low power state;

means coupled to said first timer for starting said first timer, said means responsive to a detection that a connection to a base station controller has been lost;

a second timer coupled to said CPU that is set to a duration that is the amount of time that said modem will operate in said low power state;

means coupled to said second timer for starting said second timer, said means responsive to said first timer timing out;

a counter coupled to said CPU that is set to a value that is the maximum number of times said modem will operate in said low power state before restarting said first timer and attempting to register said modem with a base station controller;

means coupled to said counter for setting and starting said counter, said means responsive to said first timer timing out;

means coupled to said counter for detecting the value of said counter;

a third timer coupled to said CPU that is set to a time duration that is the maximum amount of time that said modem will attempt to register with a base station controller before re-entering said low power state after sleeping for a time determined by said second timer; and means coupled to said third timer for starting said second timer, said means responsive to a detection that said counter is greater than zero;

wherein said CPU is operative under the control of said operating system instructions to cause said modem to operate in a normal modem active state when said modem registers with a base station controller before said first timer times out, said CPU is further operative to cause said modem to operate in said low power state for the time duration of said second timer when said modem is unable to register itself with a base station controller before said first timer times out, said CPU is further operative when said counter value is zero to cause said modem to awaken from said low power state and to attempt to register with a base station controller at the point when said second timer timers out, said CPU is further operative to cause said modem to operate in a normal modem active state when said modem registers with a base station controller before said third timer times out, and said CPU is further operative to cause said modem to operate in said low power state for the time duration of said second timer when said modem is unable to register itself with a base station controller before said third timer times out.

* * * * *